March 17, 1964  K. V. J. GARD  3,125,115
PRESSURE RESPONSIVE FLOW CONTROL VALVES
Filed Sept. 4, 1962  3 Sheets-Sheet 1

INVENTOR
KENNETH VICTOR JOHN GARD
BY Dean Fairbank & Hirsch
ATTORNEYS

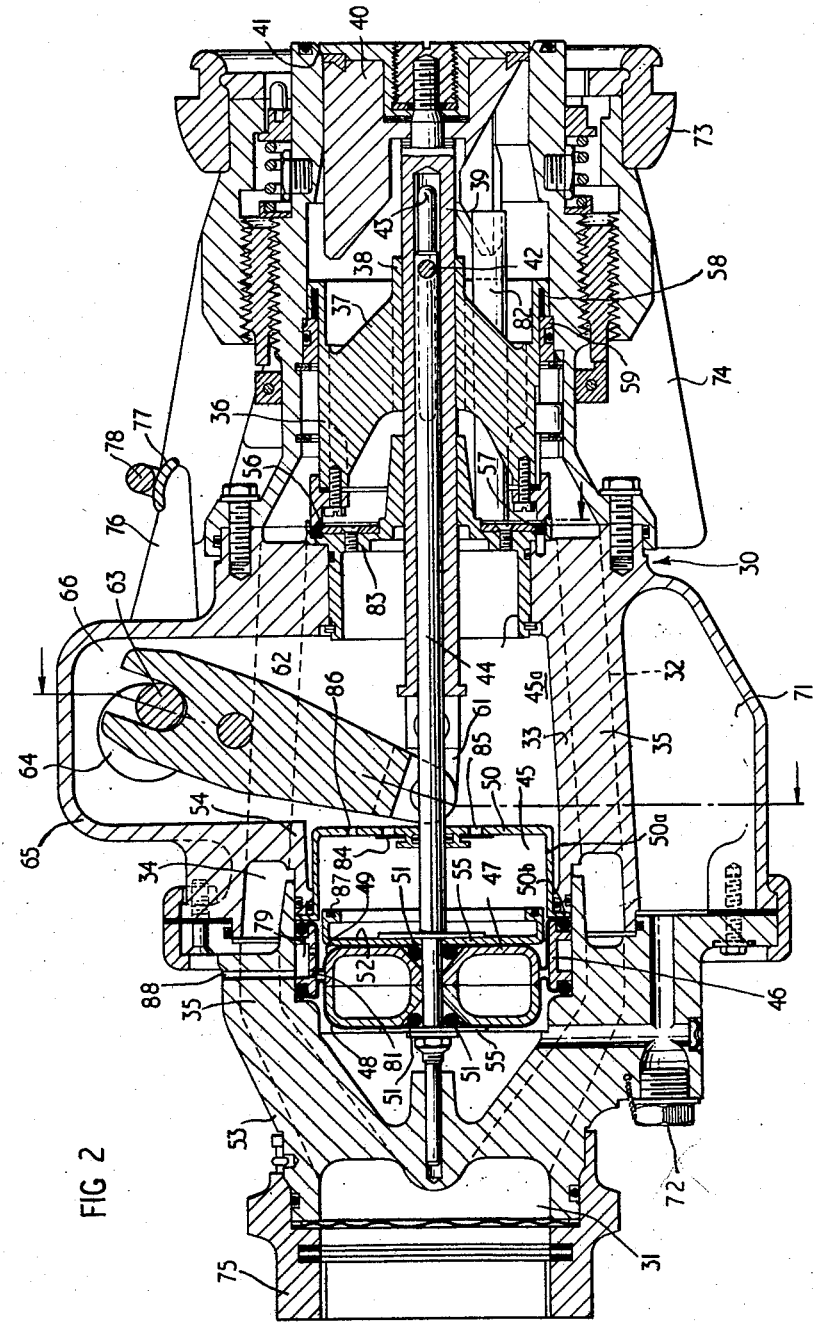

March 17, 1964   K. V. J. GARD   3,125,115
PRESSURE RESPONSIVE FLOW CONTROL VALVES
Filed Sept. 4, 1962   3 Sheets-Sheet 3
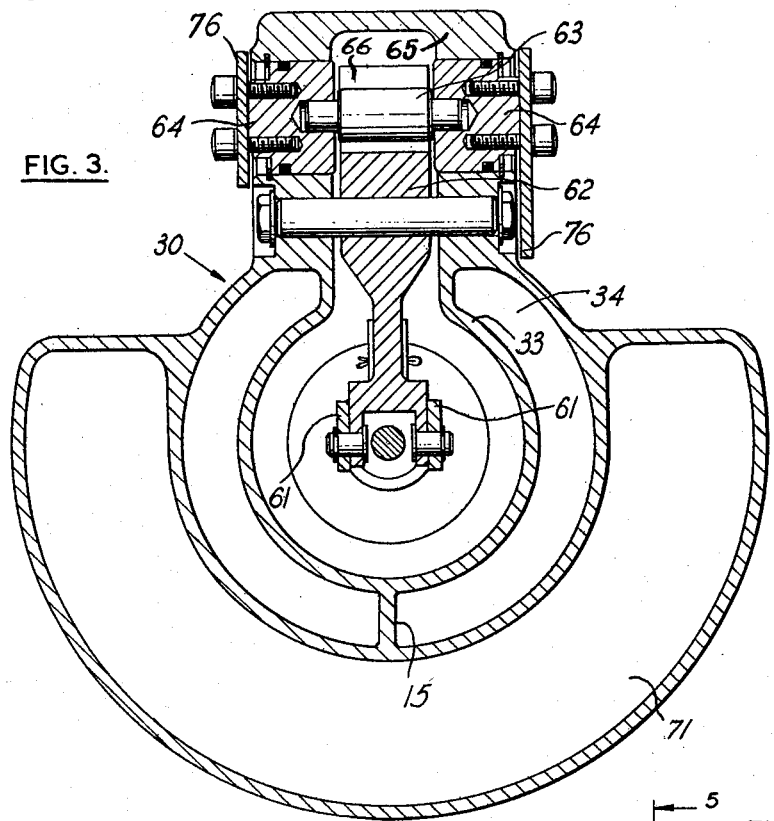
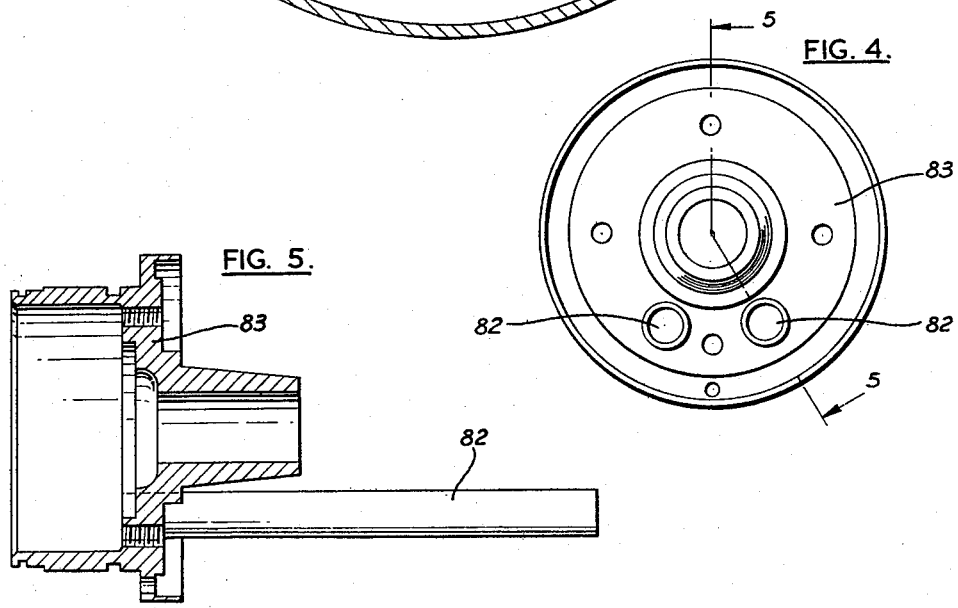

United States Patent Office 3,125,115
Patented Mar. 17, 1964

3,125,115
PRESSURE RESPONSIVE FLOW CONTROL VALVES
Kenneth Victor John Gard, East Perth, Western Australia, Australia, assignor to Flight Refuelling Limited, Blandford, England
Filed Sept. 4, 1962, Ser. No. 221,219
4 Claims. (Cl. 137—220)

This invention relates to a pressure responsive flow control valve for controlling the flow of liquid in a conduit so as to maintain, at a selected point in the conduit downstream of the valve, a predetermined substantially constant pressure.

It is the object of the present invention to provide a pressure responsive flow control valve of novel construction which, in one embodiment is able to maintain a predetermined substantially constant pressure at any desired point in the conduit downstream of the valve, and, in another embodiment, to maintain a predetermined substantially constant pressure at the valve itself.

The flow control valve according to the invention is particularly suitable for use in equipment for refuelling aircraft, in which equipment it is desirable that the pressure at which the fuel enters the fuel tanks of the aircraft shall not exceed a predetermined value.

In the accompanying drawings, which show two embodiments of the invention,

FIGURE 2 is a similar longitudinal section through another form of control valve arranged to maintain a substantially constant pressure at the valve itself and combined with a hose coupler for connecting a refuelling hose to an aircraft;

FIGURE 3 is a transverse section on the line 3—3 of FIGURE 2;

FIGURE 4 is an end elevation of a part of the control valve shown in FIGURE 2; and FIGURE 5 is a section on the line 5—5 of FIGURE 4.

Figure 1:
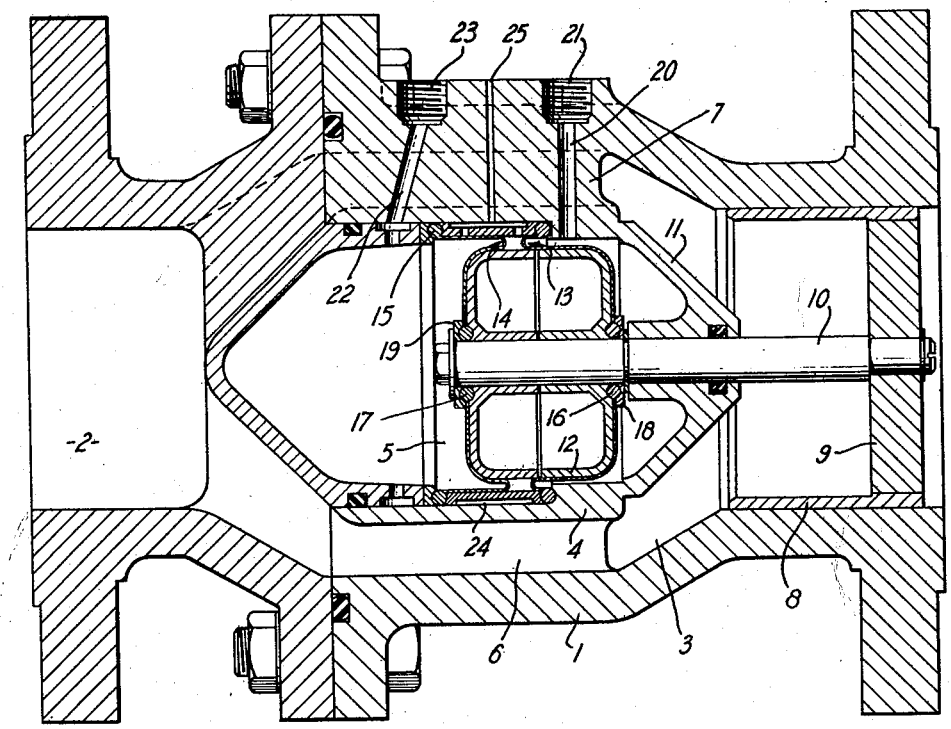
FIGURE 1 is a longitudinal section through one form of control valve arranged to maintain a substantially constant pressure at a point in the conduit downstream thereof.

Referring to FIGURE 1 of the drawing, the valve body 1 of the valve, has a straight through passage 2 enlarged at its centre portion 3 to accommodate a hollow body 4, tapered at its ends and forming a control chamber 5. An annular space 6 around the hollow body forms part of the through passage, being divided into segments by webs 7 supporting the said body 4.

A flow controlling member 8, in the form of a sleeve slidable in one end of the through passage towards and away from the hollow body 4, is connected by spider arms 9 to a stem 10 extending through a bearing 11 in one end of the hollow body, the stem carrying, inside the hollow body, a generally cylindrical plunger 12 of such a diameter that its peripheral surface is spaced from the wall of the control chamber.

A pair of flexible sleeve-like diaphragms 13, 14 are each secured at one end 15 to the wall of the control chamber 5, the points at which they are secured being spaced apart along the chamber, parts of the two diaphragms lying along the wall of the chamber between their fixing points thereto, and the diaphragms being folded back on themselves so that the other parts thereof lie against the peripheral wall of the plunger 12 and extend over the ends of the latter to fixing points where their other ends 16, 17 respectively are clamped between the ends of the plunger and clamping rings 18, 19 respectively surrounding the stem. Longitudinal sliding movement of the plunger 12 thus causes one diaphragm to roll from the surface of the plunger 12 on to the wall of the chamber, and the other to roll in the opposite direction.

The end of the control chamber 5 adjacent the flow controlling member 8 is connected, by a passage 20 in one of the webs 7 to a port 21 in the valve body. The port is connectable through suitable conduits, to the throat of a venturi disposed in a conduit on the downstream side of the valve so as to produce a pressure in that end of the control chamber which varies with the pressure in the conduit at the venturi. The other end of the control chamber 5 is connected by a passage 22 to a further port 23 in the valve body the said port being connectable to a constant pressure source such as a vessel containing stored air or gas.

The space 24 between the two diaphragms 13, 14 is connected to the outside of the valve body by a vent 25, and failure of either one of the diaphragms will allow liquid to leak out through this vent, thus drawing attention to the failure.

It will be apparent that variations in pressure at the venturi throat will cause changes in the pressure differential across the plunger tending to move the plunger and flow controlling member 8 in such a way as to increase the flow as the pressure falls and decrease the flow as the pressure rises, thus tending to keep the said pressure constant. In the drawing the member 8 is shown in its limit position to the right and will move to the left upon corresponding movement of the plunger 12.

Referring to FIGURES 2 to 5 of the drawing the valve body 30 of the valve has a straight through passage 31 enlarged at its centre portion 32 to accommodate a hollow body 33 whilst providing around the said hollow body an annular passage 34 of substantially uniform cross-sectional area at all parts of its length, the hollow body 33 being supported by webs 35 extending across the passage 34.

A flow controlling member 36 in the form of a sleeve slidable in one end of the through passage towards and away from the hollow body 33 is connected by spider arms 37 to a smaller sleeve 38 slidable on a tubular member 39 which carries on one end thereof a shut-off member 40 co-operating with a seating at 41 at that end of the through passage, the sleeve 38 being secured, by a diametral pin 42 passing through longitudinal slots 43 in the tubular member 39, to a rod 44, the tubular member 39 and rod 44 extending through an aperture in the adjacent end of the hollow body 33. The tubular member 39 is a substantially fluid-tight sliding fit in the said aperture, and the rod 44 is a substantially fluid-tight sliding fit in the tubular member 39.

A control chamber 45 in the interior of the hollow body 33 has a substantially cylindrical wall formed in part by a sleeve 46 and in part by a cylindrical wall 50a of a cup-like member 50 defining one end of the control chamber, a generally cylindrical plunger 47 of such diameter that its peripheral surface is spaced radially from the wall of the control chamber.

A pair of sleeve-like diaphragms 48, 49 are each secured at one end to the wall of the control chamber and at the other end to the plunger 47, the points at which the said diaphragms are secured to the chamber wall being spaced apart along the said wall and the said diaphragms being folded back on themselves so that a part of each sleeve adjacent its fixing point on the chamber wall lies against that wall, and another part thereof lies against the peripheral surface of the plunger, longitudinal movement of the plunger in the control chamber causing one diaphragm to roll from the surface of the plunger 47 on to the chamber wall and causing the other diaphragm to roll from the said wall on to the surface of the plunger 47.

The ends of the diaphragms are formed with beads 51, the beads at the ends which are secured to the chamber wall being clamped in one case between one end of the sleeve 46 and a shoulder on one of the main structural members 53 of the valve body 30 and in the other case between the other end of the sleeve 46 and an external flange 50b on the member 50, which flange is interposed between the sleeve 46 and a shoulder on the other main structural member 54 of the valve body. The beads 51 at the ends of the diaphragms which are secured to the plunger 47 are clamped in the one case between an end face of the plunger and a clamping plate 55, and in the other case between an end face of the plunger and the base of a shallow cup-shaped member 52 held against that end of the plunger by another clamping plate 55.

The flow controlling member 36 has on its end adjacent the hollow body 33 an annular surface 56 adapted to come into sealing engagement with a sealing ring 57 on the end of the hollow body, and has mounted on its other end another sealing ring 58 adapted to come into sealing engagement with a shoulder 59 formed in the passage 31 to prevent leakage around the exterior of said member.

The cup-shaped member 50 separate the control chamber 45 from a chamber 45a in the hollow body 33 which is connected to the main flow passage on the downstream side of the flow control member 36 (the right-hand side in FIGURE 2) through tube 82 mounted in a closure member 83 closing the right-hand end of the chamber 45a, and a one-way flap valve 84 controls orifices 85 in the base of the cup-shaped member 50 to permit free flow of liquid into the control chamber from the chamber 45a. Restricted flow of liquid in the opposite direction between the chambers 45 and 45a is permitted by a small orifice 86. The control chamber 45 is connected through a passage 67 to a part-annular air chamber 71 surrounding the valve body, into which air can be pumped through an inflation port at 72 to create any desired air pressure therein.

The tubular member 39 is connected by a pivoted link 61 inside the chamber 45a to an arm 62 pivotally mounted in the said chamber and movable to open and close the shut-off valve by a pin 63 mounted eccentrically in a pair of plugs 64 rotatable in openings in the side walls of a lateral extension 65 of the chamber 45a, the pin 63 engaging in a notch 66 in the arm 62.

The valve body 30 is adapted for connection at its right-hand end in FIGURE 2, to a fuel inlet of an aircraft, suitable interengaging means on the body 30 and on the fuel inlet being operated by rotating a ring 73 on the valve body relative to the said fuel inlet by means of handles one of which is shown at 74. The other end of the valve body 30 is adapted for connection to a flexible hose through a ring 75 capable of rotation on the said body.

The plugs 64 which carry the eccentric pin 63 have secured to them arms 76 coupled together by a bridge-piece 77, and the handle 74 carries a projection 78 which, when the ring 73 is in the position for releasing the interengaging means, overlies the bridge-piece 77 and prevents the shut-off valve from being operated.

The sleeve 46 is formed with a circumferential groove 79 on its outer side, connected by apertures 81 to the space between the diaphragms 48, 49 and also connected by a passage 88 to the exterior of the body 30.

The flow control valve is shown in FIGURE 2 in the closed position and with the air chamber 71 empty. To prepare the valve for use, air is pumped into the chamber 71 to provide a pressure therein equal to the maximum liquid pressure which is to be permitted at the valve outlet, this pressure acting in the control chamber 45 to move the plunger 47 to the right and so move the flow control member 36 away from its seat at 57. When the valve is to be used, the body 30 is coupled to an aircraft fuel inlet and the arms 76 are moved to cause opening of the shut-off valve 40. Liquid then flows through the hose to which the body 30 is connected and through the flow passage in the body in to the aircraft fuel tanks. Liquid also passes through the tubes 82 and flap valve 50 into the control chamber 45 to create a thrust on the plunger 47 opposing the thrust thereon due to the air pressure in the chamber 71 and, if the liquid pressure tends to rise above the air pressure, the flow control member 36 is moved towards its seat to throttle the flow, thus preventing the liquid pressure on the downstream side of the flow control member from rising above the predetermined value.

The provision of the tubes 82 enables the liquid pressure acting in the control chamber 45 to be taken from a point as near as possible to the outlet of the valve so that a rapid response is ensured to any rise of pressure in the tank or the like to which liquid is being supplied.

The shallow cup-shaped member 52 has a packing ring 87 mounted in a groove around the annular face of its rim, so that, if the said member is moved far enough to the right for the packing ring 87 to engage the inner face of the member 50, it seals off the control chamber 45 from the chamber 45a. The valve can therefore be used for removing fuel from aircraft tanks as well as for re-fuelling, the sealing off of the control chamber 45 preventing suction from being exerted in the said control chamber to draw the diaphragm 49 away from the chamber wall and plunger and damage it.

It will be appreciated that, for removing fuel, the valve is coupled to the tank to be emptied, and suction is applied to the hose. There being no pressure at the right-hand end of the valve passage, the air pressure in the chamber 71 acts on the left-hand side of the plunger 47 to cause it to unseat the flow-control member 36, and fuel is withdrawn through the hose. Suction is also applied through the tubes 82 to the chamber 45a and control chamber 45 and the plunger 47 is drawn fully to the right, causing the packing ring 87 to engage the inner surface of the member 50 and seal off the control chamber 45 from further suction.

The sealing rings 57 and 58 are of the same diameter, so that the flow controlling member 36 is fully balanced with respect to the liquid pressure in the valve and has no tendency to move from its closed position in response to liquid pressure acting directly thereon in either direction, and is controlled entirely by the relative pressures on opposite sides of the plunger 47. Moreover, the sealing rings 57 and 58 provide liquid-tight seals at both ends of the flow controlling member so that the said member provides a liquid-tight closure of the valve passage when it is in the closed position.

This application is a continuation-in-part of my prior applications 33,226 filed June 1, 1960, and 134,642 filed August 29, 1961, which applications are now abandoned.

I claim:

1. A flow control valve for maintaining a predetermined substantially constant pressure in liquid flowing therethrough comprising a valve body defining a flow passage therethrough, a flow controlling member movable in the said body to provide a variable restriction of said flow passage, means defining a control chamber co-axial with said flow controlling member, a plunger movable in said control chamber and coupled to said flow controlling member so as to move therewith, said plunger having a small clearance in said control chamber, sealing means for said plunger comprising a pair of sleeve-like diaphragms turned back on themselves so as to lie each against part of the wall of the chamber and part of the peripheral wall of the plunger and to roll from one surface to the other as the plunger moves longitudinally in the chamber, the plunger dividing the control chamber into two parts, passage means connecting one of said parts to a source of constant fluid pressure which acts on said plunger to move the flow controlling member and reduce the restriction of the flow passage thereby, a partition defining the end wall of the other part of the control chamber, apertures in said partition providing communication with the downstream side of the flow controlling member, a one-way flap valve controlling said apertures to prevent flow of liquid out of said control chamber part therethrough, a constantly open bleed aperture in said partition, a member mounted on said plunger and having a rim, and a sealing ring mounted in said rim and adapted to make contact with said partition to seal the control chamber from the downstream side of said flow passage when the flow controlling member is moved to its fully open position.

2. In a flow control valve according to claim 1, and wherein the flow passage is a straight-through passage and includes an enlarged portion intermediate its ends, a hollow body mounted co-axially in the enlarged portion of the flow passage and shaped so that the cross-sectional area of the flow passage is substantially constant, and a sleeve-like member constituting the flow-controlling member, said sleeve-like member being slidable in one end of the flow passage and cooperating with one end of the hollow body to provide a variable restriction of the flow passage, said control chamber being provide in said hollow body.

3. A flow control valve according to claim 2, wherein the partition separates the control chamber from a second chamber in said hollow body and tubes extend from said second chamber to the downstream side of the flow controlling member to cause the pressure in said second chamber to be maintained equal to that on the said downstream side of the flow controlling member.

4. A flow control valve for maintaining a predetermined substantially constant pressure in the liquid flowing therethrough, comprising a valve body, a rod slidably mounted in said valve body, a flow controlling member secured to said rod and movable in the body to provide a variable restriction of the flow passage therethrough, a pressure responsive member also secured to said rod so as to move with said flow controlling member, said valve body having a cavity therein divided by said flow controlling member into two chambers, means for admitting liquid from the flow passage of the valve body on the downstream side of the flow controlling chamber to one of said chambers to urge said pressure responsive member in a direction to cause said flow controlling member to increase the restriction of the flow passage, a gas reservoir connected to the other of said chambers and adapted to contain gas under pressure acting to urge said pressure responsive member in the opposite direction, a manually operable shutoff valve provided in the flow passage through the valve body on one of side of said flow controlling member, a tubular member slidably mounted in said valve body with respect to said rod and said flow controlling member, said shutoff valve being mounted on said tubular member and manual operating mechanism on the other side of said flow controlling member connected to said tubular member.

References Cited in the file of this patent

UNITED STATES PATENTS

| | | |
|---|---|---|
| 1,998,241 | Keen | Apr. 16, 1935 |
| 2,683,565 | Johnson | July 13, 1954 |
| 2,707,966 | Taplin | May 10, 1955 |
| 2,717,003 | Jay | Sept. 6, 1955 |
| 2,725,891 | De Bourguignon | Dec. 6, 1955 |
| 2,854,023 | Heyer | Sept. 30, 1958 |
| 2,888,949 | Evans | June 2, 1959 |
| 2,969,806 | Jensen | Jan. 31, 1961 |
| 2,987,309 | Biggle | July 17, 1961 |